US006863980B2

United States Patent
Misciagna et al.

(10) Patent No.: US 6,863,980 B2
(45) Date of Patent: Mar. 8, 2005

(54) MONOLITHIC COMPOSITE FIREWALL

(75) Inventors: David T. Misciagna, Hockessin, DE (US); Dennis J. Landi, Broomall, PA (US); Philip G. Persaud, Boothwyn, PA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/267,145

(22) Filed: Oct. 8, 2002

(65) Prior Publication Data

US 2004/0067704 A1 Apr. 8, 2004

(51) Int. Cl.$^7$ ................................................. B32B 9/00
(52) U.S. Cl. ....................... 428/408; 428/435; 428/902; 428/920; 428/921; 428/473.5; 442/236; 442/262; 442/302
(58) Field of Search ................................. 428/408, 435, 428/364, 920, 921, 213; 442/236, 262, 302

(56) References Cited

U.S. PATENT DOCUMENTS

| 4,767,656 A | * | 8/1988 | Chee et al. | 428/116 |
| 4,801,496 A | * | 1/1989 | Buchacher | 428/285 |
| 5,558,932 A | * | 9/1996 | Scanlon | 428/229 |
| 5,976,997 A | * | 11/1999 | Meaney et al. | 442/232 |

* cited by examiner

Primary Examiner—Jennifer McNeil
Assistant Examiner—Abraham Bahta
(74) Attorney, Agent, or Firm—Shimokaji & Associates, P.C.

(57) ABSTRACT

A ceramic fabric and a resin are combined to form a fire protection sheet capable of being co-cured onto a parent laminate structure. The resulting monolithic composite firewall shows fire protection ability comparable to that of the conventional titanium structure, without the problems associated therewith, such as titanium panel separation and disbonding. The fire protection sheet easily conforms to the shape of the parent laminate and is also useful as a repair material for damaged conventionally protected firewalls.

19 Claims, 5 Drawing Sheets

MONOLITHIC COMPOSITE FIREWALL

GOVERNMENT RIGHTS

This invention was first conceived or first built and tested in the course of work under U.S. government contract number V22 Program N0019-85-C-0145. The government may have certain rights in this invention.

BACKGROUND OF THE INVENTION

The present invention generally relates to apparatus and methods for fireproofing and, more specifically, to apparatus and methods of providing a monolithic composite firewall in the canted deck of an aircraft.

Temperature and safety considerations bring out the need for fireproofing in a variety of applications. For example, the canted deck of the V-22 Osprey aircraft has a fire protection requirement for the cabin roof below the mid-wing area below the auxiliary power unit (APU).

Referring to FIG. 3, there is shown a conventional configuration of the graphite panel from which the V-22 canted deck is constructed. Graphite panel 130 may be made of a plurality of graphite plies 140. Each graphite ply 140 may be bonded with an adjacent graphite ply 140 by any conventional means such as a commercially available resin. Preferably, graphite panel 130 contains from 4 to 12 graphite plies 140. More preferably, graphite panel 130 contains from 6 to 10 graphite plies 140.

Referring to FIGS. 1–2, there is shown a conventional means for providing fire protection in an aircraft canted deck. Fire protection for the V-22 canted deck 100 utilizes 0.012 in thick titanium panels 110 which are mechanically fastened and bonded to the V-22's canted deck 100. Titanium panels 110 are bonded at bond area 120 to the graphite panel 130 which makes up the canted deck 100. Mechanical fasteners pass through holes 122 in titanium panel 110 for mechanically securing graphite panel 130 to titanium panel 110. The titanium panels 110 require secondary bonding in addition to mechanical fastening in order to be secured to the graphite laminate 130 of the canted deck 100. Over time, the bond line between the titanium panels 110 and the canted deck 100 becomes susceptible to dis-bonding, thus allowing fluids to migrate between these two surfaces. This creates a potential safety issue as the integrity of the firewall is reduced.

Conventional titanium panel firewalls have the further disadvantage of increased fabrication complexity and manufacturing flow time. Under current procedure, the titanium panels are manufactured and located on the canted deck. Pilot holes are drilled through the panels and the canted deck skin. These holes are opened to full size and the panel is disassembled. After cleaning/deburring/abrading the entrance and exit holes in the panel and canted deck skin, the panel is reassembled and bonded to the canted deck. Finally, mechanical fasteners are applied through the previously drilled holes to secure the titanium panel firewall to the canted deck. In addition, the manufacture of titanium panel firewalls is made even more difficult when the parts are highly contoured.

Conventional titanium panel firewalls have the additional disadvantage of high cost and weight. Providing adequate firewall protection within a defined cost/weight parameter is an important consideration. Precision aircraft, such as the V-22 Osprey, have specific specifications with respect to firewall durability and overall weight.

As can be seen, there is a need for an improved apparatus and method that provides an effective, durable, weight proportionate firewall without the need for secondary bonding, mechanical fasteners or complex manufacturing steps.

SUMMARY OF THE INVENTION

In one aspect of the present invention, a firewall for a parent laminate comprises a ceramic fabric; and a resin bonding the ceramic fabric to the parent laminate, the ceramic fabric and film adhesive being co-cured into the parent laminate to create the firewall.

In another aspect of the present invention, a monolithic composite firewall for a laminate surface comprises a ceramic fabric; a resin; the ceramic fabric impregnated with the resin to make a resin impregnated ceramic fabric; and the resin impregnated ceramic fabric being co-cured with the laminate surface to form the monolithic composite firewall.

In a further aspect of the present invention, a monolithic composite firewall for a laminated deck of an aircraft comprises a ceramic fabric capable of withstanding temperatures of about 2200° F.; a resin; the ceramic fabric impregnated with the resin to make a resin impregnated ceramic fabric; and the resin impregnated ceramic fabric being co-cured with the laminated deck to form the monolithic composite firewall.

In yet another aspect of the present invention, a method for making a firewall material on a parent laminate, comprises impregnating a ceramic fabric with a resin to form a firewall prepreg material; and co-curing the firewall prepreg material with the parent laminate to make the firewall material.

In a still further aspect of the present invention, a method for providing firewall protection on a laminated deck of an aircraft, comprises impregnating a ceramic fabric with a resin to form a firewall prepreg; the ceramic fabric includes continuous alumina-boria-silica fibers and is capable of withstanding temperatures of about 2200° F.; co-curing the firewall prepreg on the laminated deck to provide firewall protection thereto.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a ceramic fabric and film adhesive which are combined to form a fire protection sheet capable of being co-cured onto a parent laminate structure. The resulting monolithic composite firewall shows fire protection ability comparable to that of the conventional titanium structure, without the problems associated therewith. The fire protection sheet easily conforms to the shape of the parent laminate and is also useful as a repair material for conventionally protected firewalls. The present invention also provides a method of making such a monolithic composite firewall.

This is unlike the conventional firewall material in that the firewall material of the present invention is a monolithic composite firewall. Conventional firewall materials are formed as separate sheets attached via a bonding material and mechanical fasteners to the parent laminate. This conventional structure results in problems with dis-bonding, difficulties in manufacture, and high cost and weight. The monolithic composite of the present invention solves these problems by structurally incorporating the firewall as part of the parent laminate by co-curing bonding material for the individual parent laminate plies with the bonding material of the firewall material.

While the embodiment below describes fire protection for a graphite laminate structure, the present invention is not intended to be limited thereto. The Nextel® fabric may be used as fire protection for bonding to any composite material such as graphite, carbon fiber reinforced plastic, fiberglass, thermoplastic, bismaleimide (BMI), and the like.

The embodiment below describes the use of Nextel® fabric as fire proofing for the canted deck of an aircraft. However, the present invention is not limited to such use. The present invention may be applicable where any material capable of being co-cured with the Nextel® fabric is in need of fire protection. For example, such a monolithic composite fire protection structure may be useful in furnace applications and the like.

Figure 4:
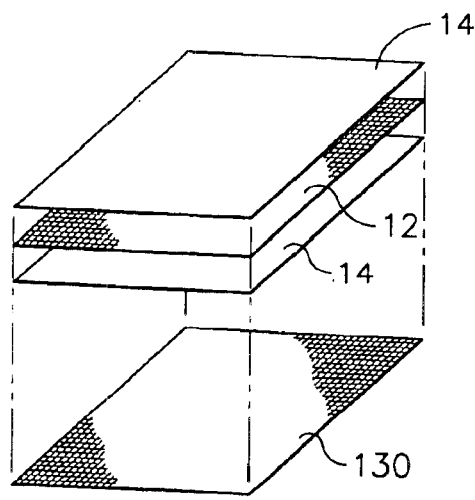
FIG. 4 is a perspective drawing showing a fire protection configuration according to an embodiment of the present invention.

Referring to FIG. 4, there is shown a fire protection configuration according to an embodiment of the present invention. The bonding for the individual plies of graphite panel 130 may be co-cured with the resin bonding a sheet of Nextel® 312 (3M Corporation) fabric 12. Nextel® 312 fabric 12 is composed of continuous polycrystalline metal oxide fibers suitable for producing textiles without the aid of other fiber or metal inserts. More specifically, Nextel® 312 is made of 10–12 $\mu$m filaments having a $9Al_2O_3:2B_2O_3+$ amorphous $SiO_2$ crystal type. The composition of Nextel® 312 fabric is about 62 wt. % $Al_2O_3$, 24 wt. % $SiO_2$, and 14 wt. % $B_2O_3$.

The fabric 12 may be bonded to the graphite plies 140 by sandwiching the fabric 12 between two plies of film adhesive 14. Cytec FM®-300 film adhesive may be used advantageously as the bonding material. In this embodiment of the invention, the Cytec film adhesive 14 is co-cured with the bonding for the graphite plies 140 to form the monolithic firewall material.

The fabric 12 may also be purchased in prepreg form as a pre-impregnated fabric. The formation of a Nextel® 312 prepreg fabric may be performed in any conventional resin prepreg-formation process. The pre-impregnated fabric may then be cut to the appropriate size and co-cured with the bonding for the graphite plies 140 to form the monolithic firewall material.

According to one feature of the present invention, the resin used to bond graphite plies 140 may be the same as the resin used to impregnate Nextel® fabric 12. While not limited to any particular resin system, FM®-300 and Metlbond® 1515 (Cytec Industries) are suitable resins for bonding both the graphite plies 140 to themselves and the fabric 12 to the graphite plies 140. Such a system removes the need for using one resin to attach the firewall material to the graphite panel and a separate resin for making the graphite panel from its individual graphite plies.

EXAMPLES

Figure 1:
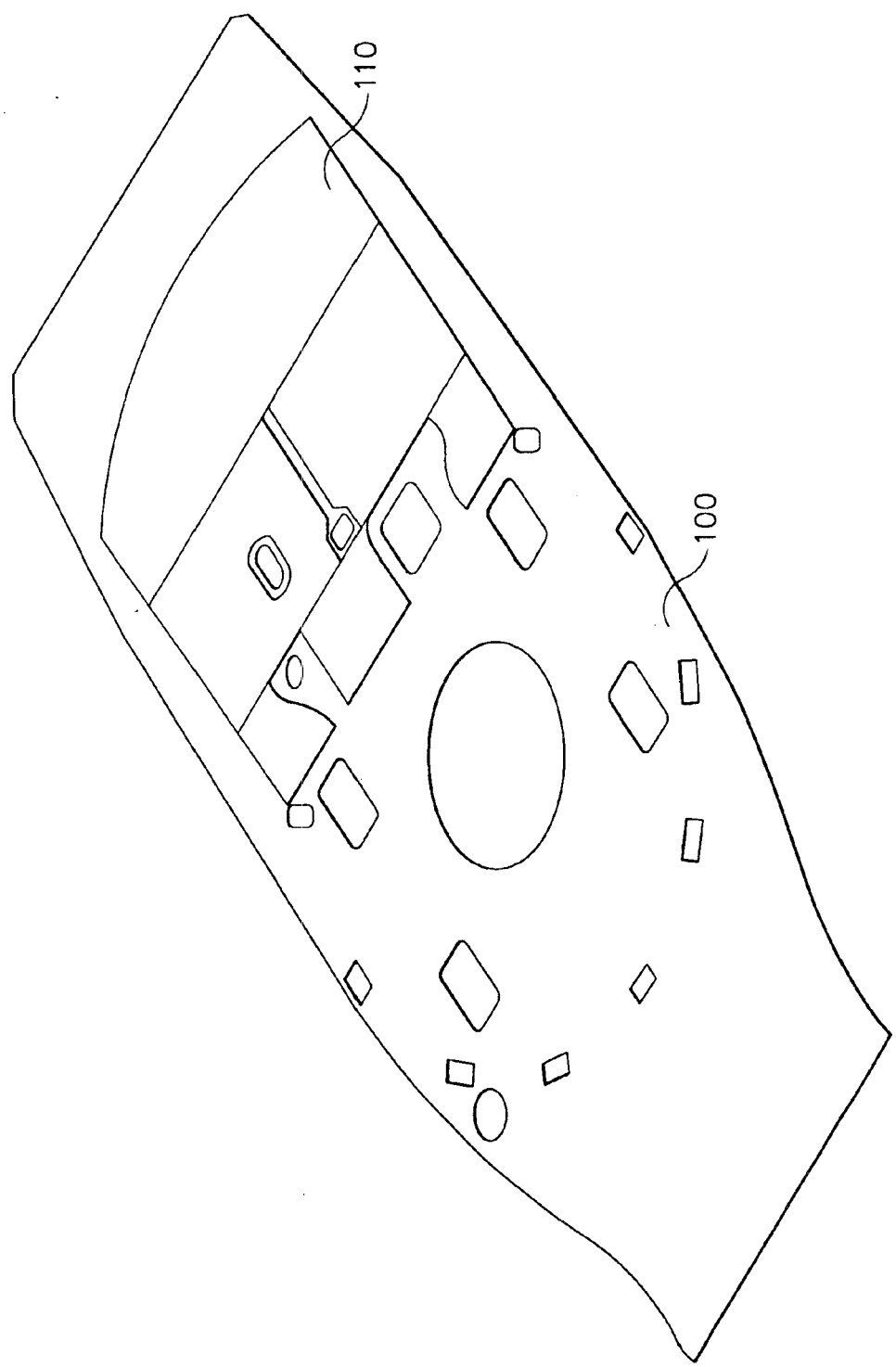
FIG. 1 is a plan drawing showing the canted deck of the V22 Osprey aircraft.
Figure 2:
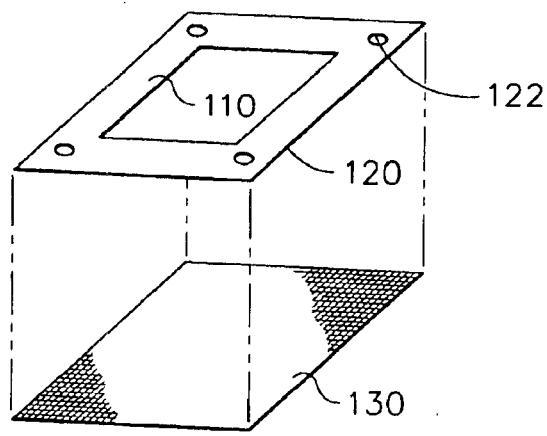
FIG. 2 is a perspective drawing showing a conventional configuration for fire protection.

Referring back to FIG. 2, a conventional panel, hereinafter referred to as "config 1", was assembled by attaching, through bonding and mechanical fasteners, a 12 inch square titanium panel 110 to a 12 inch square graphite panel 130. Bonding was applied to 1 to 2 inch peripheral bond area 120.

Referring now to FIG. 4, a fire protection configuration according to the present invention, hereinafter referred to as "config 2", was prepared by sandwiching one ply of Nextel® 312 fabric 12 between 2 plies of film adhesive 14. Vacuum was applied for about 10 to 15 minutes at 120° F. The resulting impregnated fabric is co-cured with the resin that bonds a plurality of graphite plies which make up graphite panel 130.

Figure 3:
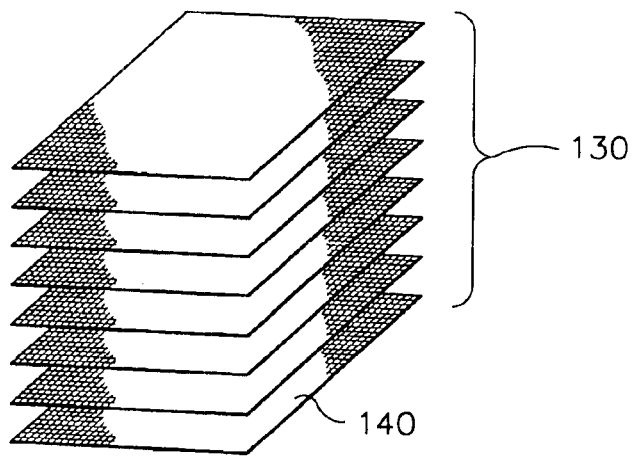
FIG. 3 is a perspective drawing showing a graphite panel having no fire protection.

Referring again to FIG. 3, a control panel was prepared by bonding eight 12 inch square graphite plies 140 to form graphite panel 130. The resulting graphite panel 130 is hereinafter referred to as "config 3".

Three panels from each of config 1, config 2, and config 3 were tested. Each panel was tested per BSS 7338 Propane Burner Test Method. More specifically, the test panels were exposed to a 2000° F. flame for 15 minutes over a minimum area of 5 square inches with an average heat flux of 9.3 $BTU/ft^2 \cdot sec$.

Figure 5:
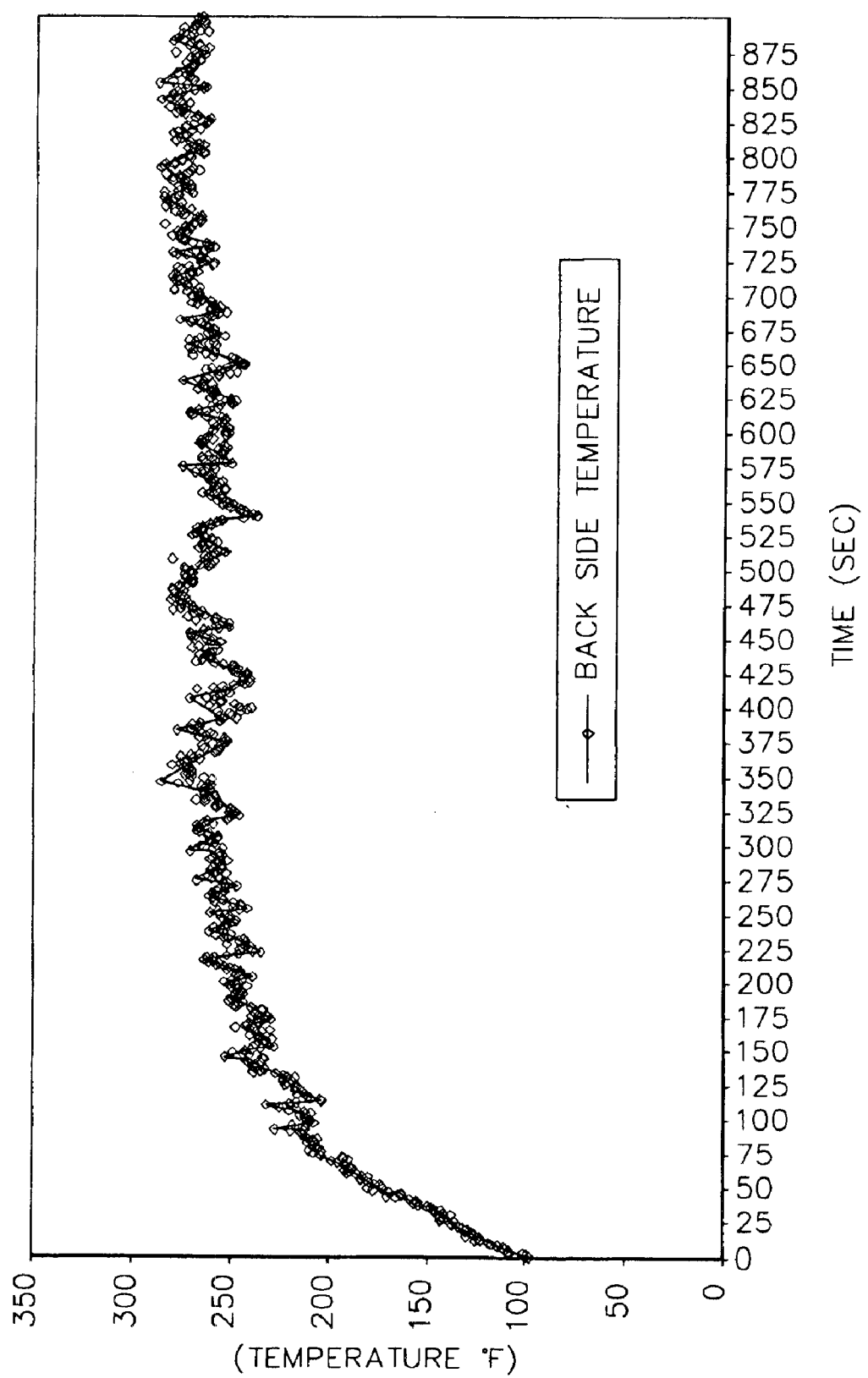
FIG. 5 is a graph showing temperature measurements using a conventional configuration for fire protection.
Figure 6:
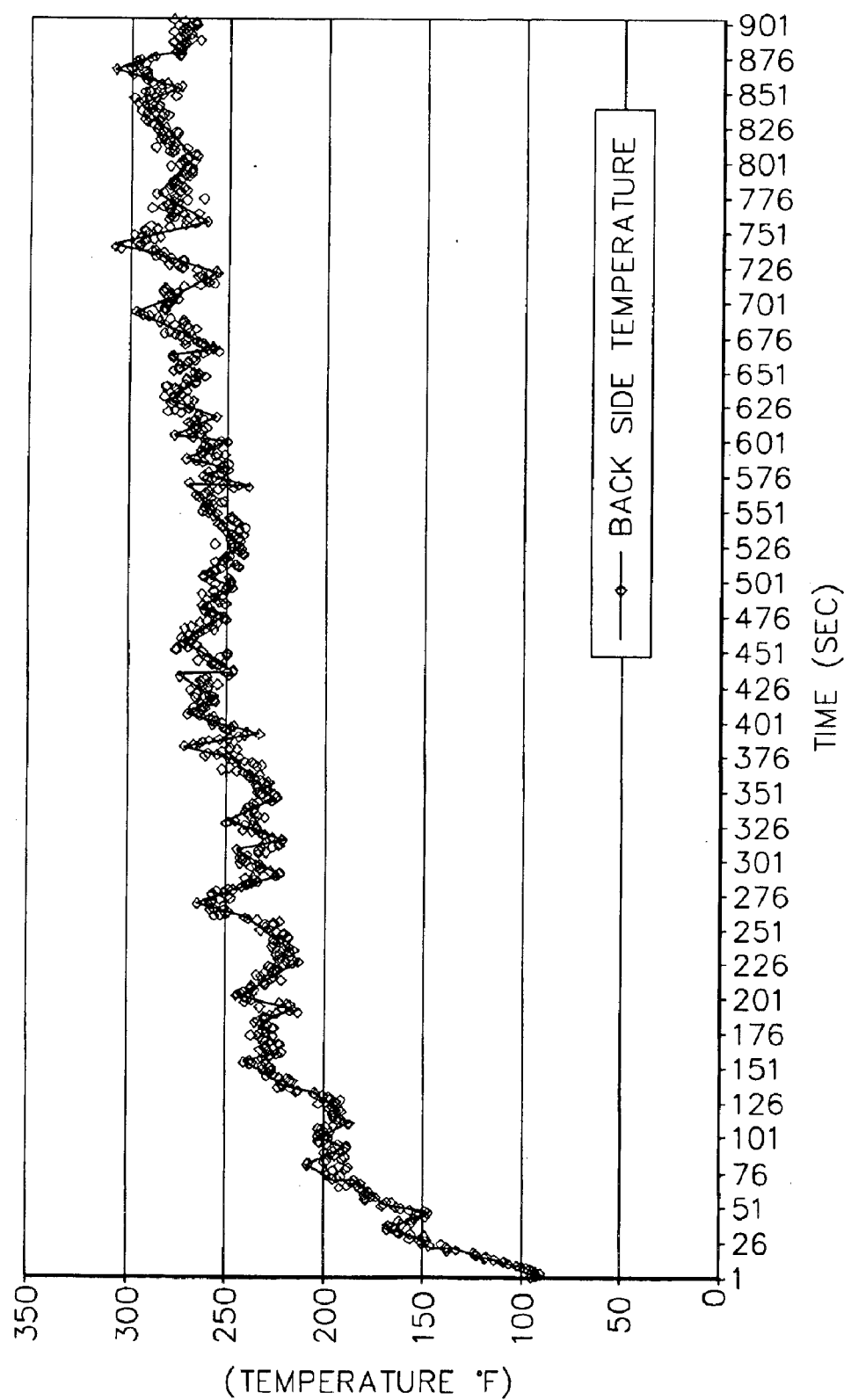
FIG. 6 is a graph showing temperature measurements using a fire protection configuration according to an embodiment of the present invention.
Figure 7:
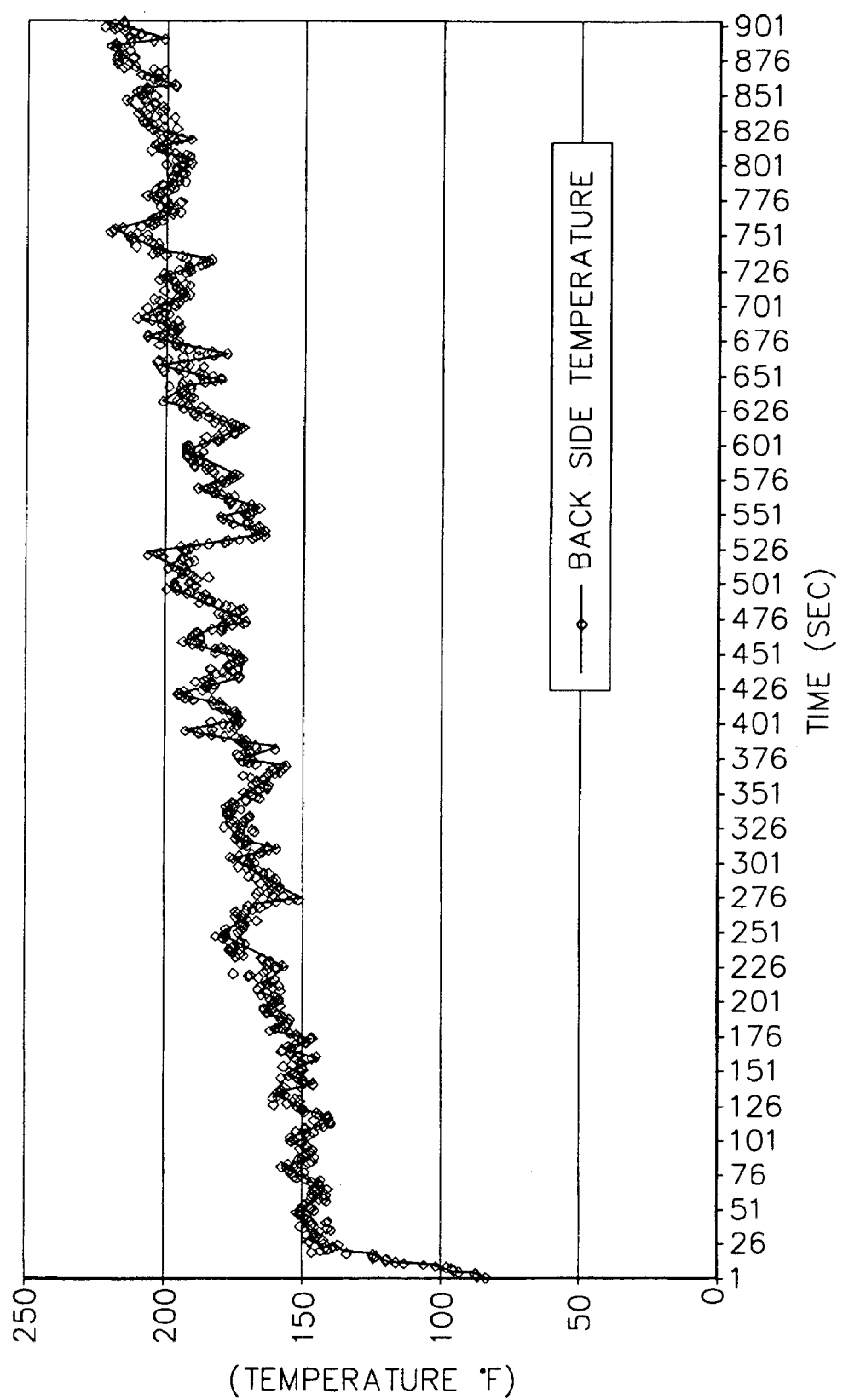
FIG. 7 is a graph showing temperature measurements using a graphite laminate material without fire protection.

Referring to FIGS. 5–7, the temperature, recorded at the backside of each panel, was recorded as a function of time. With the panels having fire protection (config 1 and config 2), the temperature was recorded 1 inch above the panel. With the graphite panel without fire protection (config 3), the temperature was recorded 4 inches above the panel. FIG. 5 represents one panel selected from the three tested for config 1, FIG. 6 represents one panel selected from the three tested for config 2, and FIG. 7 represents one panel selected from the three tested for config 3.

Referring to FIGS. 5 and 6, both the titanium and Nextel® panels passed the flame penetration test. The backside temperatures of the titanium and Nextel® configurations were approximately 300° F. by the end of the fifteen minute test.

Referring to FIG. 7, the unprotected graphite panels showed signs of burn through after about fourteen and a half minutes. As can be seen from the graph, the backside temperature reading is beginning to rise starting at about the 876 second mark. Therefore, the unprotected graphite panels failed the flame penetration test.

The titanium panels (config. 1) distorted and warped due to the extreme heat. The resin used to bond the titanium to the graphite was burned off as well as most of the resin in the graphite. If the titanium panels were not mechanically fastened, they would have separated from the graphite portion of the panels.

The Nextel® fabric did not separate from the composite (config. 2) and stayed in intimate contact with the graphite, even though most of the resin in the composite was burned off. Both the titanium (config. 1) and the Nextel® (config. 2) configurations are comparable for their fire proofing characteristics. However, the Nextel® configuration (config. 2) will reduce production cost and flow time in the manufacturing of the canted deck. The Nextel® configuration (config. 2) also does not need to be mechanically fastened to the canted deck. Therefore, there will not be a knock down factor associated with the holes of config. 1 for the fasteners that secure the titanium. In other words, the overall buckling strength of the Nextel® configuration (config. 2) is not compromised by the need to use mechanical fastener holes, as is the case in the conventional titanium configuration (config. 1). The Nextel® configuration (config. 2) should also reduce the weight compared to that associated with the conventional titanium fire protection (config. 1).

The ceramic fabric of the present invention may be used as a repair material in addition to the being used as an initial fire proofing material. Should burn through or removal of the existing fire protection occur, the Nextel® fabric may be placed over and sufficiently around the burned through area. A film adhesive, such as Cytec FM™300 brand film adhesive may be used to cure the fabric to the laminate.

It should be understood, of course, that the foregoing relates to preferred embodiments of the invention and that modifications may be made without departing from the spirit and scope of the invention as set forth in the following claims.

We claim:

1. A firewall comprising:

a ceramic fabric;

a parent laminate having a plurality of individual plies;

a film adhesive, the film adhesive bonding said ceramic fabric to said parent laminate; and a resin, the resin bonding said plurality of individual plies, said film adhesive and said resin being co-cured to create said firewall, where the film adhesive and the resin are the same.

2. The firewall according to claim 1, wherein said ceramic fabric includes continuous alumina-boria-silica fibers and is capable of withstanding temperatures of about 2200° F.

3. The firewall according to claim 1, wherein said ceramic fabric contains about 62 wt. % $Al_2O_3$, 24 wt. % $SiO_2$, and 14 wt. % $B_2O_3$.

4. The firewall according to claim 1, wherein said ceramic fabric is from about 5 to 15 mil thick.

5. The firewall according to claim 1, wherein said ceramic fabric is about 10 mil thick.

6. The firewall according to claim 1, wherein said ceramic fabric is pre-impregnated with said film adhesive.

7. The firewall according to claim 1, wherein said parent laminate is a canted deck of an aircraft.

8. The firewall according to claim 1, wherein said plurality of individual plies comprises graphite layers.

9. A monolithic composite firewall comprising:

a ceramic fabric;

a laminate comprising a plurality of individual plies;

a film adhesive for bonding said individual plies;

a resin;

said ceramic fabric impregnated with said resin to make a resin impregnated ceramic fabric; and said resin impregnated ceramic fabric being co-cured with said film adhesive to form said monolithic composite firewall.

10. The firewall according to claim 9, wherein said ceramic fabric includes continuous alumina-boria-silica fibers and is capable of withstanding temperatures of about 2200° F.

11. The firewall according to claim 9, wherein said ceramic fabric contains about 62 wt. % $Al_2O_3$, 24 wt. % $SiO_2$, and 14 wt. % $B_2O_3$.

12. The firewall according to claim 9, wherein said ceramic fabric is from about 5 to 15 mil thick.

13. The firewall according to claim 9, wherein said ceramic fabric is about 10 mil thick.

14. The firewall according to claim 9, wherein said laminate is a canted deck of an aircraft.

15. The firewall according to claim 9, wherein said laminate comprises a plurality of graphite layers.

16. The firewall according to claim 15, wherein said film adhesive is the same as said resin.

17. A monolithic composite firewall comprising:

a ceramic fabric capable of withstanding temperatures of about 2200° F.;

a laminate comprising a plurality of individual plies;

a resin for bonding said individual plies;

said ceramic fabric impregnated with said resin to make a resin impregnated ceramic fabric;

said impregnated ceramic fabric being co-cured with said laminate to form said monolithic composite firewall.

18. A laminated aircraft deck with a monolithic composite firewall comprising:

a parent laminate comprising a plurality of individual laminate plies;

a resin bonding said individual plies;

a ceramic fabric capable of withstanding temperatures of about 2200° F. and where the ceramic fabric contains about 62 wt. % $Al_2O_3$, 24 wt. % $SiO_2$, and 14 wt. % $B_2O_3$.; and a film adhesive bonding said ceramic fabric with said individual plies, said monolithic composite firewall being farmed when said resin is co-cured with said film adhesive, where the film adhesive and the resin are the same.

19. The laminated aircraft deck according to claim 18, wherein card individual plies are graphite plies.

* * * * *